J. WARNER.
SUPPORTS FOR UPRIGHT STANDARDS.

No. 175,844.  Patented April 11, 1876.

Witnesses:
Lewis F. Broust
A. P. Grant

Inventor:
James Warner,
by John A. Wiederstein
Atty.

N. PETERS, PHOTO-LITHOGRAPHER, WASHINGTON, D.C.

UNITED STATES PATENT OFFICE.

JAMES WARNER, OF PHILADELPHIA, PENNSYLVANIA.

IMPROVEMENT IN SUPPORTS FOR UPRIGHT STANDARDS.

Specification forming part of Letters Patent No. 175,844, dated April 11, 1876; application filed March 6, 1876.

*To all whom it may concern:*

Be it known that I, JAMES WARNER, of the city and county of Philadelphia and State of Pennsylvania, have invented a new and useful Improvement in Stands for Christmas Trees, Poles, &c.; and I do hereby declare the following to be a clear and exact description of the nature thereof, sufficient to enable others skilled in the art to which my invention appertains to fully understand, make, and use the same, reference being had to the accompanying drawings, making part of this specification, in which—

Figure 1:
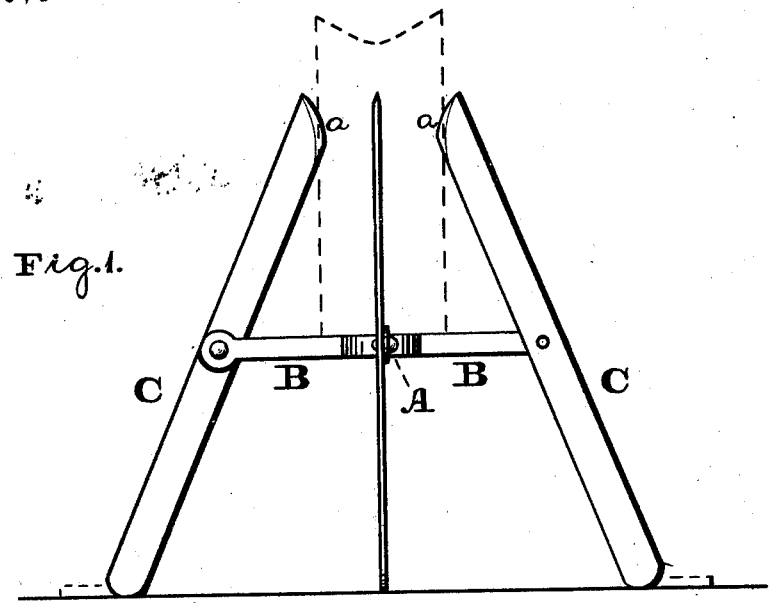
Figure 2:
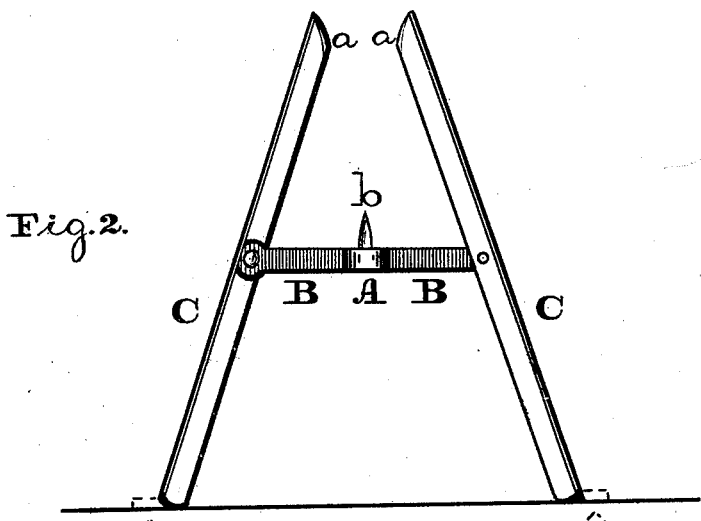
Figure 3:
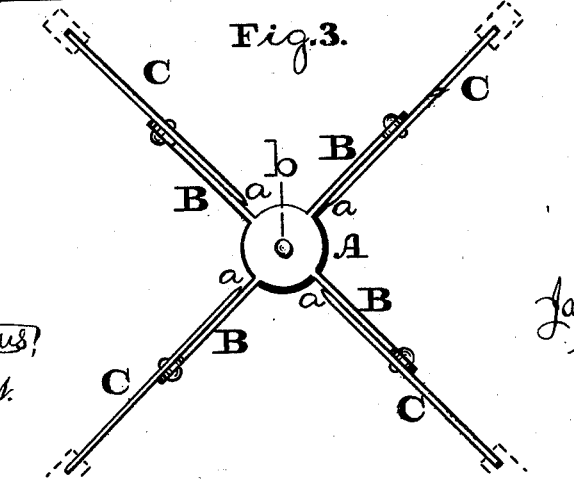

Figures 1 and 2 are side elevations of the device embodying my invention. Fig. 3 is a top or plan view thereof.

Similar letters of reference indicate corresponding parts in the several figures.

My invention relates to a stand for Christmas trees, poles, &c., and consists of a central support and hinged feet, whose upper portions adjustably embrace and pierce the trunk of the tree or pole, and are tightened by the weight thereof.

Referring to the drawings, A represents a central support, from which radiate arms B, to which are pivoted feet C, whose axes are between the ends of said feet, so that a portion of the latter are above and below the arms B.

The upper ends of the feet may be sharpened, the cutting-edges *a* facing each other, and from the support A there rises a prong or stud, *b*, which is adapted to pierce the bottom of the tree or pole, flower-pot, or otherwise.

The tree will be placed on the support A and the upper portions of the feet C, moved in thereagainst, whereby the lower portions of the feet will be moved outwardly and form a wide base.

The sharp edges *a* of the feet will be driven into the wood and the stand will be steadily supported.

It will be seen that the feet are adjustable to various sizes of trees or poles, and the tree will not overturn owing to the wide base of, or the flaring form assumed by, the feet, and the weight of the tree or pole on the central support will cause the bottom of the feet to widen or spread, whereby the upper portions of the feet will be moved inwardly against the trunk or pole, thus increasing pressure thereagainst, so that said tree or trunk will be firmly held and steadily supported.

When the stand is not required, the feet may be folded, and they will assume somewhat horizontal positions.

Having thus described my invention, what I claim as new, and desire to secure by Letters Patent, is—

The stand for Christmas trees, &c., consisting of the central support A, radiating arms B, and hinged legs C, constructed, combined, and operating substantially as described.

JAMES WARNER.

Witnesses:
 JOHN A. WIEDERSHEIM,
 H. E. HINDMARSH.